US012621030B2

(12) United States Patent
Deghel et al.

(10) Patent No.: US 12,621,030 B2
(45) Date of Patent: May 5, 2026

(54) ENHANCED CSI REPORTING ACTIVATION/DEACTIVATION OPERATION

(71) Applicant: NOKIA TECHNOLOGIES OY, Espoo (FI)

(72) Inventors: Matha Deghel, Montrouge (FR); Samuli Heikki Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/174,341

(22) Filed: Apr. 9, 2025

(65) Prior Publication Data

US 2025/0266885 A1     Aug. 21, 2025

Related U.S. Application Data

(63) Continuation of application No. PCT/CN2023/093882, filed on May 12, 2023.

(51) Int. Cl.
*H04W 24/10* (2009.01)
*H04B 7/06* (2006.01)

(52) U.S. Cl.
CPC .......... *H04B 7/0626* (2013.01); *H04W 24/10* (2013.01)

(58) Field of Classification Search
CPC .............................. H04B 7/0626; H04W 24/10
See application file for complete search history.

(56) References Cited

U.S. PATENT DOCUMENTS

| | | | |
|---|---|---|---|
| 10,778,367 B2 | 9/2020 | Zhou et al. |
| 2021/0351826 A1 | 11/2021 | Wei |
| 2022/0174686 A1 | 6/2022 | Xiao et al. |
| 2022/0190991 A1 | 6/2022 | Nimbalker et al. |
| 2022/0376868 A1 | 11/2022 | Mttanen et al. |

(Continued)

FOREIGN PATENT DOCUMENTS

| | | |
|---|---|---|
| CN | 111316568 A | 6/2020 |
| CN | 113647045 A | 11/2021 |

(Continued)

OTHER PUBLICATIONS

"3rd Generation Partnership Project; Technical Specification Group Radio Access Network; NR; Medium Access Control (MAC) protocol specification (Release 15)", 3GPP TS 38.321 v15.3.0, (Sep. 2018), 76 pages.

(Continued)

*Primary Examiner* — Chuong A Ngo
(74) *Attorney, Agent, or Firm* — ALSTON & BIRD LLP

(57) ABSTRACT
Example embodiments of the present disclosure provide solutions for enhanced channel state information (CSI) activation/deactivation operation. In an example method, a terminal device receives a MAC CE comprising at least one field for a CSI report configuration, wherein the CSI report configuration comprises a plurality of sub-configurations. The terminal device further determines activation or deactivation of at least one of the plurality of sub-configurations at least based on the at least one field in the MAC CE. In this way, the operation of activating/deactivating CSI reporting for one or more sub-configurations is enabled when multiple sub-configurations are included or associated with a same CSI reporting configuration.

29 Claims, 7 Drawing Sheets

510

Receive a MAC CE comprising at least one field for a CSI report configuration, wherein the CSI report configuration comprise a plurality of sub-configurations

520

Determine activation or deactivation of at least one of the plurality of sub-configurations at least based on the at least one field in the MAC CE

(56)        References Cited

U.S. PATENT DOCUMENTS

| 2023/0120578 A1 | 4/2023 | Khoshnevisan et al. |
| 2024/0405826 A1* | 12/2024 | Ly .......................... H04L 5/0053 |

FOREIGN PATENT DOCUMENTS

| EP | 4415289 | A1 | 8/2024 |
| EP | 4443805 | A1 | 10/2024 |
| WO | 2017/128800 | A1 | 8/2017 |
| WO | 2022/047759 | A1 | 3/2022 |
| WO | 2022/261923 | A1 | 12/2022 |
| WO | 2024/169064 | A1 | 8/2024 |
| WO | 2024/172552 | A1 | 8/2024 |
| WO | 2024/172894 | A1 | 8/2024 |
| WO | 2024/229797 | A1 | 11/2024 |
| WO | 2024/237590 | A1 | 11/2024 |

OTHER PUBLICATIONS

"3rd Generation Partnership Project; Technical Specification Group Radio Access Network; NR; Medium Access Control (MAC) protocol specification (Release 17)", 3GPP TS 38.321 v17.4.0, (Mar. 2023), 252 pages.

Huawei et al., "Clarification on the initial state of elements controlled by MAC CE and non-numerical K1 value", 3GPP TSG-RAN WG2 Meeting #117-e, R2-2203825, Change Request CR 1209, (Feb. 21-Mar. 3, 2022), 12 pages.

Huawei et al., "Discussion on CSI configuration framework", 3GPP TSG RAN WG1 Meeting #92, R1-1802076, (Feb. 26-Mar. 2, 2018), 9 pages.

Huawei, "FL summary#4 for spatial and power domain techniques for R18 NES", 3GPP TSG-RAN WG1 Meeting #112bis-e, R1-2303916, (Apr. 17-26, 2023), 228 pages.

International Search Report and Written Opinion for Patent Cooperation Treaty Application No. PCT/CN2023/093882 dated Dec. 19, 2023, 8 pages.

MediaTek Inc et al., "Miscellaneous editorial changes for 38.321", 3GPP TSG-RAN2 Meeting #121, R2-2302111, Change Request CR 1572, (Feb. 27-Mar. 3, 2023), 244 pages.

Qualcomm Incorporated, "R2-1810456, Corrections on SP CSI reporting on PUCCH Activation/Deactivation MAC CE" 3GPP TSG-RAN WG2 Meeting #AH-1807, Jul. 6, 2018.

Vivo, "Discussions on techniques in spatial and power domains", 3GPP TSG RAN WG1 #112bis-e, R1-2302498, (Apr. 17-26, 2023), 9 pages.

* cited by examiner

| R | Serving Cell ID | | | | | BWP ID | | Oct 1 |
|---|---|---|---|---|---|---|---|---|
| R | R2 | R1 | R0 | $S_3$ | $S_2$ | $S_1$ | $\mathbf{S_0}$ | Oct 2 |

FIG. 4A

| R | Serving Cell ID | | | | | BWP ID | | Oct 1 |
|---|---|---|---|---|---|---|---|---|
| R | $R_{02}$ | $R_{01}$ | $R_{00}$ | $S_3$ | $S_2$ | $\mathbf{S_1}$ | $\mathbf{S_0}$ | Oct 2 |
| R | R | R | R | R | R | $S_{11}$ | $S_{10}$ | Oct 3 |

FIG. 4B

| R | Serving Cell ID | | | | | BWP ID | | Oct 1 |
|---|---|---|---|---|---|---|---|---|
| R | R | R | R | $S_3$ | $S_2$ | $S_1$ | $S_0$ | Oct 2 |
| R | $S_{06}$ | $S_{05}$ | $S_{04}$ | $S_{03}$ | $S_{02}$ | $S_{01}$ | $S_{00}$ | Oct 3 |
| R | R | R | R | $S_{13}$ | $S_{12}$ | $S_{11}$ | $S_{10}$ | Oct 4 |

FIG. 4C

| R | Serving Cell ID | | | | | BWP ID | | Oct 1 |
|---|---|---|---|---|---|---|---|---|
| R | R | R | R | $S_3$ | $S_2$ | $S_1$ | $S_0$ | Oct 2 |
| $S_{13}$ | $S_{12}$ | $S_{11}$ | $S_{10}$ | $S_{03}$ | $S_{02}$ | $S_{01}$ | $S_{00}$ | Oct 3 |

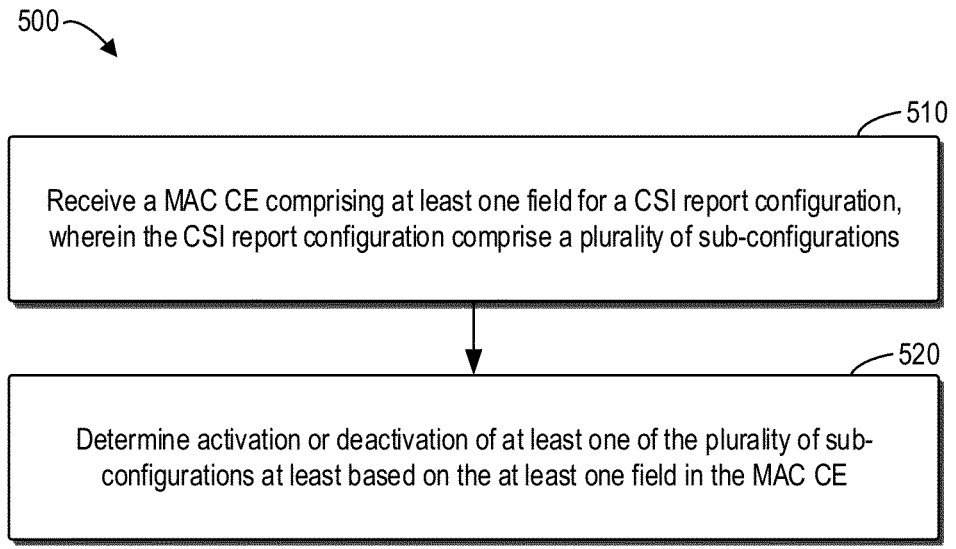

Receive a MAC CE comprising at least one field for a CSI report configuration, wherein the CSI report configuration comprise a plurality of sub-configurations ⌐510

Determine activation or deactivation of at least one of the plurality of sub-configurations at least based on the at least one field in the MAC CE ⌐520

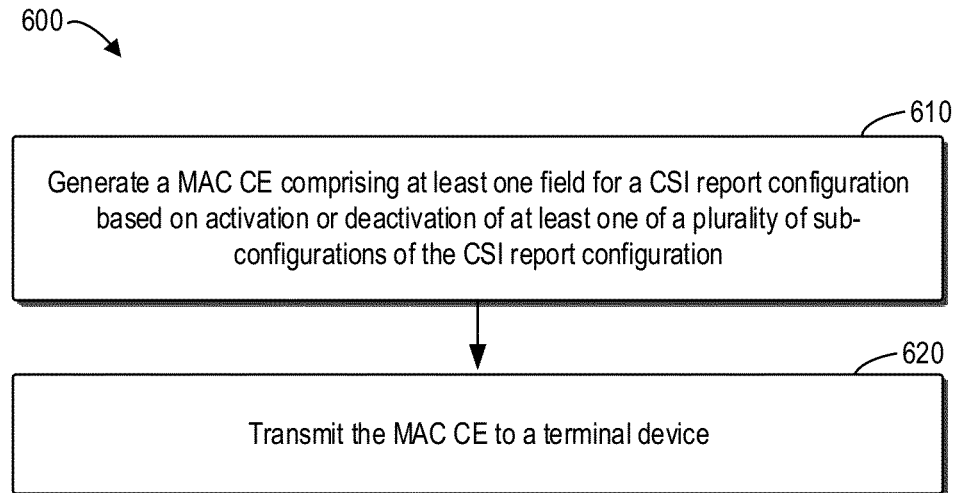

Generate a MAC CE comprising at least one field for a CSI report configuration based on activation or deactivation of at least one of a plurality of sub-configurations of the CSI report configuration ⌐610

Transmit the MAC CE to a terminal device ⌐620

ENHANCED CSI REPORTING ACTIVATION/DEACTIVATION OPERATION

CROSS-REFERENCE TO RELATED APPLICATIONS

This application is a continuation of International Application No. PCT/CN2023/093882, filed May 12, 2023, the entire contents of which are incorporated herein by reference.

FIELD

Example embodiments of the present disclosure generally relate to the field of communication, and in particular, to a terminal device, a network device, methods, apparatuses, and a computer readable medium for enhanced channel state information (CSI) activation/deactivation operation.

BACKGROUND

Network energy saving is of great importance for environmental sustainability, to reduce environmental impact (greenhouse gas emissions), and for operational cost saving. As new radio (NR), also known as fifth-generation technology standard for broadband cellular networks (5G), is becoming pervasive across industries and geographical areas, handling more advanced services and applications requiring very high data rates, networks are being denser, use more antennas, larger bandwidths and more frequency bands, which means an increasing energy consumption.

Therefore, the environmental impact of 5G and the operational operating expense need to stay under control, and improved solutions for energy saving in 5G need to be further investigated and studied.

SUMMARY

In general, example embodiments of the present disclosure provide solutions for enhanced channel state information (CSI) activation/deactivation operation.

In a first aspect, there is provided a terminal device. The terminal device comprises at least one processor and at least one memory storing instructions that, when executed by the at least one processor, cause the terminal device at least to: receive a medium access control (MAC) control element (MAC CE) comprising at least one field for a channel state information (CSI) report configuration, wherein the CSI report configuration comprises a plurality of sub-configurations; and determine activation or deactivation of at least one of the plurality of sub-configurations at least based on the at least one field in the MAC CE.

In a second aspect, there is provided a network device. The network device comprises at least one processor and at least one memory storing instructions that, when executed by the at least one processor, cause the network device at least to: generate a medium access control (MAC) control element (MAC CE) comprising at least one field for a channel state information (CSI) report configuration based on activation or deactivation of at least one of a plurality of sub-configurations of the CSI report configuration; and transmit the MAC CE to a terminal device.

In a third aspect, there is provided a method. The method comprises: receiving, at a terminal device, a medium access control (MAC) control element (MAC CE) comprising at least one field for a channel state information (CSI) report configuration, wherein the CSI report configuration comprises a plurality of sub-configurations; and determining activation or deactivation of at least one of the plurality of sub-configurations at least based on the at least one field in the MAC CE.

In a fourth aspect, there is provided a method. The method comprises: generating, at a network device, a medium access control (MAC) control element (MAC CE) comprising at least one field for a channel state information (CSI) report configuration based on activation or deactivation of at least one of a plurality of sub-configurations of the CSI report configuration; and transmitting the MAC CE to a terminal device.

In a fifth aspect, there is provided an apparatus. The apparatus comprises: means for receiving, at a terminal device, a medium access control (MAC) control element (MAC CE) comprising at least one field for a channel state information (CSI) report configuration, wherein the CSI report configuration comprises a plurality of sub-configurations; and means for determining activation or deactivation of at least one of the plurality of sub-configurations at least based on the at least one field in the MAC CE.

In a sixth aspect, there is provided an apparatus. The apparatus comprises: means for generating, at a network device, a medium access control (MAC) control element (MAC CE) comprising at least one field for a channel state information (CSI) report configuration based on activation or deactivation of at least one of a plurality of sub-configurations of the CSI report configuration; and means for transmitting the MAC CE to a terminal device.

In a seventh aspect, there is provided a non-transitory computer-readable storage medium comprising program instructions. The program instructions, when executed by an apparatus, cause the apparatus to perform at least the following: receiving, at a terminal device, a medium access control (MAC) control element (MAC CE) comprising at least one field for a channel state information (CSI) report configuration, wherein the CSI report configuration comprises a plurality of sub-configurations; and determining activation or deactivation of at least one of the plurality of sub-configurations at least based on the at least one field in the MAC CE.

In an eighth aspect, there is provided a non-transitory computer-readable storage medium comprising program instructions. The program instructions, when executed by an apparatus, cause the apparatus to perform at least the following: generating, at a network device, a medium access control (MAC) control element (MAC CE) comprising at least one field for a channel state information (CSI) report configuration based on activation or deactivation of at least one of a plurality of sub-configurations of the CSI report configuration; and transmitting the MAC CE to a terminal device.

In a ninth aspect, there is provided a computer program comprising instructions, which, when executed by an apparatus, cause the apparatus at least to: receive, at a terminal device, a medium access control (MAC) control element (MAC CE) comprising at least one field for a channel state information (CSI) report configuration, wherein the CSI report configuration comprises a plurality of sub-configurations; and determine activation or deactivation of at least one of the plurality of sub-configurations at least based on the at least one field in the MAC CE.

In a tenth aspect, there is provided a computer program comprising instructions, which, when executed by an apparatus, cause the apparatus at least to: generate, at a network device, a medium access control (MAC) control element (MAC CE) comprising at least one field for a channel state information (CSI) report configuration based on activation or deactivation of at least one of a plurality of sub-configurations of the CSI report configuration; and transmit the MAC CE to a terminal device.

In an eleventh aspect, there is provided a terminal device. The terminal device comprises: a receiving circuitry configured to: receive a medium access control (MAC) control element (MAC CE) comprising at least one field for a channel state information (CSI) report configuration, wherein the CSI report configuration comprises a plurality of sub-configurations; and determine activation or deactivation of at least one of the plurality of sub-configurations at least based on the at least one field in the MAC CE.

In a twelfth aspect, there is provided a network device. The network device comprises: a transmitting circuitry configured to: generate a medium access control (MAC) control element (MAC CE) comprising at least one field for a channel state information (CSI) report configuration based on activation or deactivation of at least one of a plurality of sub-configurations of the CSI report configuration; and transmit the MAC CE to a terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which:

FIG. 4A illustrates a first example MAC CE design for activating/deactivating semi-persistent CSI reporting according to example embodiments of the present disclosure;

FIG. 4B illustrates a second example MAC CE design for activating/deactivating semi-persistent CSI reporting according to example embodiments of the present disclosure;

FIG. 4C illustrates a third example MAC CE design for activating/deactivating semi-persistent CSI reporting according to example embodiments of the present disclosure;

FIG. 4D illustrates a fourth example MAC CE design for activating/deactivating semi-persistent CSI reporting according to example embodiments of the present disclosure;

FIG. 5 illustrates an example flowchart of a method implemented at a terminal device according to example embodiments of the present disclosure;

FIG. 6 illustrates an example flowchart of a method implemented at a network device according to example embodiments of the present disclosure;

Throughout the drawings, the same or similar reference numerals represent the same or similar elements.

DETAILED DESCRIPTION

Figure 1:
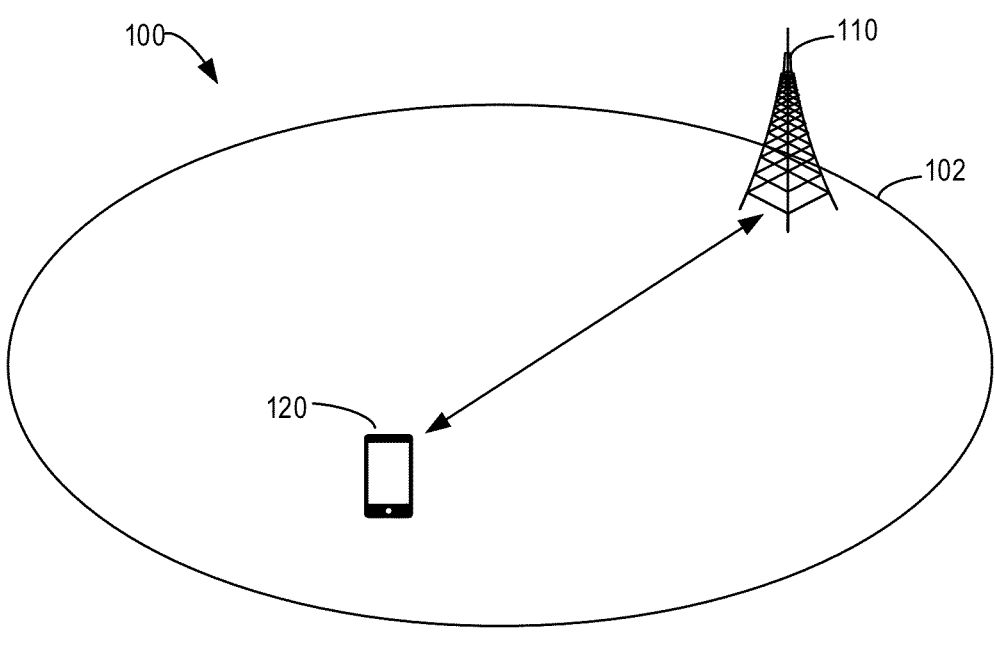
FIG. 1 illustrates an example network environment in which example embodiments of the present disclosure may be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and

(ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "network", "communication network" or "data network" refers to a network following any suitable communication standards, such as long term evolution (LTE), LTE-advanced (LTE-A), wideband code division multiple access (WCDMA), high-speed packet access (HSPA), narrow band Internet of things (NB-IoT), wireless fidelity (Wi-Fi) and so on. Furthermore, the communications between a terminal device and a network device/element in the communication network may be performed according to any suitable generation communication protocols, including, but not limited to, the fourth generation (4G), 4.5G, the future fifth generation (5G), IEEE 802.11 communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP) or a transmission and reception point (TRP), for example, a node B (NodeB or NB), an evolved NodeB (eNodeB or eNB), a NR NB (also referred to as a gNB), a remote radio unit (RRU), a radio header (RH), a remote radio head (RRH), a WiFi device, a relay, a low power node such as a femto, a pico, and so forth, depending on the applied terminology and technology. In the following description, the terms "network device", "AP device", "AP" and "access point" may be used interchangeably.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), a station (STA) or station device, or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "station", "station device", "STA", "terminal device", "communication device", "terminal", "user equipment" and "UE" may be used interchangeably.

The term "transceiver" may refer to any device that may be coupled to one or more antennas or antenna ports to wirelessly transmit and/or receive communication signals. The antennas or antenna ports may be the same or different types. The antennas or antenna ports may be located in different positions of an apparatus. One or more transceivers allow the apparatus to communicate with other devices that may be wired and/or wireless. The one or more transceivers may include processors, controllers, radios, sockets, plugs, buffers, or the like circuits to form one or more communication channels to one or more radio frequency units. The one or more transceivers may be integrated in an apparatus or a system, for example a cellular communication apparatus or system, a WLAN system, or a short ranging system for example Bluetooth system.

For physical uplink control channel (PUCCH)-based semi-persistent reporting, activation/deactivation is performed by transmitting a medium access control (MAC) control element (MAC CE) message. A UE shall perform semi-persistent CSI reporting on the PUCCH applied starting from slot $$n + 3N_{slot}^{subframe,\mu} + 1$$

after the Hybrid Automatic Repeat request Acknowledgment (HARQ-ACK) corresponding to the physical uplink shared channel PDSCH carrying the selection command MAC CE is transmitted in slot n.

Semi-persistent CSI reporting on the PUCCH supports Type I CSI. Semi-persistent CSI reporting on the PUCCH format 2 supports Type I CSI with wideband frequency granularity. Semi-persistent CSI reporting on PUCCH formats 3 or 4 supports Type I CSI with wideband and sub-band frequency granularities and Type II CSI Part 1.

Below is the existing MAC CE design for activation/deactivation of SP (semi-persistent) CSI reporting on PUCCH (in TS 38.321).

6.1.3.16 SP CSI reporting on PUCCH Activation/Deactivation MAC CE

The SP CSI reporting on PUCCH Activation/Deactivation MAC CE is identified by a MAC subheader with LCID as specified in Table 6.2.1-1. It has a fixed size of 16 bits with following fields:
- Serving Cell ID: This field indicates the identity of the Serving Cell for which the MAC CE applies. The length of the field is 5 bits;
- BWP ID: This field indicates a UL BWP for which the MAC CE applies as the codepoint of the DCI bandwidth part indicator field as specified in TS 38.212 [9]. The length of the BWP ID field is 2 bits;
- $S_i$: This field indicates the activation/deactivation status of the Semi-Persistent CSI report configuration within csi-ReportConfigToAddModList, as specified in TS 38.331 [5]. $S_0$ refers to the report configuration which includes PUCCH resources for SP CSI reporting in the indicated BWP and has the lowest CSI-ReportConfigId within the list with type set to semiPersistentOnPUCCH, $S_1$ to the report configuration which includes PUCCH resources for SP CSI reporting in the indicated BWP and has the second lowest CSI-ReportConfigId and so on. If the number of report configurations within the list with type set to semiPersistentOnPUCCH in the indicated BWP is less than i + 1, MAC entity shall ignore the $S_i$ field. The $S_i$ field is set to 1 to indicate that the corresponding Semi-Persistent CSI report configuration shall be activated. The $S_i$ field is set to 0 to indicate that the corresponding Semi-Persistent CSI report configuration i shall be deactivated;
- R: Reserved bit, set to 0.

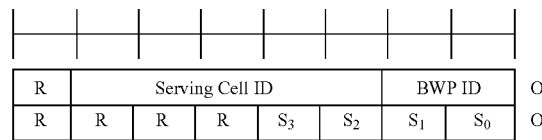

| R | Serving Cell ID | | | | | BWP ID | | Oct 1 |
|---|---|---|---|---|---|---|---|---|
| R | R | R | R | $S_3$ | $S_2$ | $S_1$ | $S_0$ | Oct 2 |

FIG. 6.1.3.16-1: SP CSI reporting on PUCCH Activation/Deactivation MAC CE

It is approved in the Rel-18 work item description (WID) to specify necessary enhancements on CSI and beam management related procedures including measurement and report, and signaling to enable efficient adaptation of spatial elements (e.g. antenna ports, active transceiver chains) [RAN1, RAN2].

One of the recent RAN1 agreements is below.

Agreement
At least support A2-2, i.e. one CSI report configuration contains multiple CSI report sub-configurations where each sub-configuration corresponds to one spatial adaptation pattern.
    -FFS: impact on CSI processing requirement
Agreement
For CSI report configuration, if L>1 in a CSI report configuration, at least the following can be included for each sub-configuration for Type 1 SD adaptation
    -N1, N2 for single-panel and N1, N2, Ng for multi-panel
        -FFS: details on explicit indication or implicit derivation
    -Port subset indication when A1-2 is used (if A1-2 is supported)
        -FFS: details on explicit indication or implicit derivation
    -FFS: rank restriction
    -FFS: codebook subset restriction
    -FFS: supported codebook types for PMI, e.g., Type-I or Type-II
    -FFS: report quantity
    -FFS: reportFreqConfiguration
    -FFS: Group identity of NZP CSI-RS resource(s) in a resource set for channel measurement when A1-1 is used
For CSI report configuration for type 2 SD adaptation, further study under which cases sub-configurations may or may not be needed including sub-configuration content.

As mentioned, Rel-18 will specify enhancements for network energy saving, including spatial pattern adaptation. RAN1 reached the following agreement regarding the support of semi-persistent and aperiodic CSI reporting where, for a CSI report configuration that includes L configurations, N CSIs out of this L (where N<=L) can be triggered in one reporting instance.

Agreement
For a CSI report config with L sub-configuration(s), support a framework that enables a UE to report N CSIs(s) in one reporting instance where the N CSI(s) are associated with N sub-configuration(s) from L (where) and each CSI corresponds to one sub-configuration.
    -For discussion purpose, N=1 refers to single-CSI while N>1 refers to multi-CSI.
    -For Semi-persistent/Aperiodic CSI reporting, support gNB trigger/indicate/activate report of N≤L CSIs where N>=1
        -The maximum value of N and L are subject to UE capability
        -Further study how to address/minimize additional UE complexity
The following bullet not agreed due to objection from Apple and vivo
    -For Periodic CSI reporting, at least the case of N=L is supported where N>=1

In view of above, some embodiments of the disclosure propose an efficient design and encoding/decoding of the MAC CE for the activation or deactivation of CSI report configuration(s) to enable the above operation.

For illustrative purposes, principles and example embodiments of the present disclosure will be described below with reference to FIG. 1 to FIG. 8. However, it is to be noted that these embodiments are given to enable the skilled in the art to understand inventive concepts of the present disclosure and implement the solution as proposed herein, and not intended to limit scope of the present application in any way.

FIG. 1 illustrates an example of an application scenario 100 in which some example embodiments of the present disclosure may be implemented. The application scenario 100, which is a part of a communication network, includes terminal devices and network devices.

In the descriptions of the example embodiments of the present disclosure, the network environment 100 may also be referred to as a communication system 100 (for example, a portion of a communication network). For illustrative purposes only, various aspects of example embodiments will be described in the context of one or more terminal devices and network devices that communicate with one another. It should be appreciated, however, that the description herein may be applicable to other types of apparatus or other similar apparatuses that are referenced using other terminology.

As illustrated in FIG. 1, the communication network 100 may include a network device 110 (which may also be referred to as a gNB or BS). The communication network 100 may further include a terminal device 120 (which may also be referred to as user equipment 120 or UE 120. Although only one network device 110 and one terminal devices 120 are shown in FIG. 1, the numbers of the network device and the terminal device are not limited. In other words, there may be one or more network devices 110 and one or more terminal devices 120 in the network.

The network device 110 can provide services to the terminal device 120, and the network device 110 and the terminal device 120 may communicate data and control information with each other. In some embodiments, the network device 110 and the terminal device 120 may communicate with direct links/channels.

In the communication system 100, a link from the network device 110 to the terminal device 120 is referred to as a downlink (DL), while a link from the terminal device 120 to the network device 110 is referred to as an uplink (UL). In downlink, the network device 110 is a transmitting (TX) device (or a transmitter) and the terminal device 120 is a receiving (RX) device (or a receiver). In uplink, the terminal device 120 is a transmitting (TX) device (or a transmitter) and the network device 110 is a RX device (or a receiver). It is to be understood that the network device 110 may provide one or more serving cells. As illustrated in FIG. 1, the network device 110 provides one serving cell 102, and the terminal device 120 camps on the serving cell 102. In some embodiments, the network device 110 can provide multiple serving cells and the terminal device 120 may switch from a source cell to a target cell between the serving cells during its mobility. It is to be understood that the number of serving cell(s) shown in FIG. 1 is for illustrative purposes without suggesting any limitation.

Communications in the network environment 100 may be implemented according to any proper communication protocol(s), comprising, but not limited to, cellular communication protocols of the fourth generation (4G) and the fifth generation (5G) and on the like, wireless local network communication protocols such as Institute for Electrical and Electronics Engineers (IEEE) 802.11 and the like, and/or any other protocols currently known or to be developed in the future, such as universal mobile telecommunications System (UMTS), long term evolution (LTE), LTE-Advanced (LTE-A), the fifth generation (5G) new radio (NR), wireless fidelity (Wi-Fi) and worldwide interoperability for microwave access (WiMAX) standards, and employs any suitable communication technologies, including, for example, multiple-input multiple-output (MIMO), orthogonal frequency division multiplexing (OFDM), time division multiplexing (TDM), frequency division multiplexing (FDM), code division multiplexing (CDM), Bluetooth, Zig-Bee, and machine type communication (MTC), enhanced mobile broadband (cMBB), massive machine type communication (mMTC), ultra-reliable low latency communication (URLLC), carrier aggregation (CA), dual connectivity (DC), and new radio unlicensed (NR-U) technologies.

In some embodiments of the present disclosure, the terminal device 120 may receive a MAC CE from the network device 110 to activate or deactivate at least one CSI report configuration (for example, preconfigured via a radio resource control (RRC) message). The CSI report configuration may comprise or be associated with multiple sub-configurations. The MAC CE comprises at least one field indicative of activation or deactivation status of the sub-configurations of the CSI report configuration. Upon reception of the MAC CE, the terminal device 120 may decode or determine activation or deactivation of the sub-configurations. Afterwards, the terminal device 120 may perform CSI measurements on the activated sub-configurations and report the CSI measurement results to the network device 120.

Figure 2:
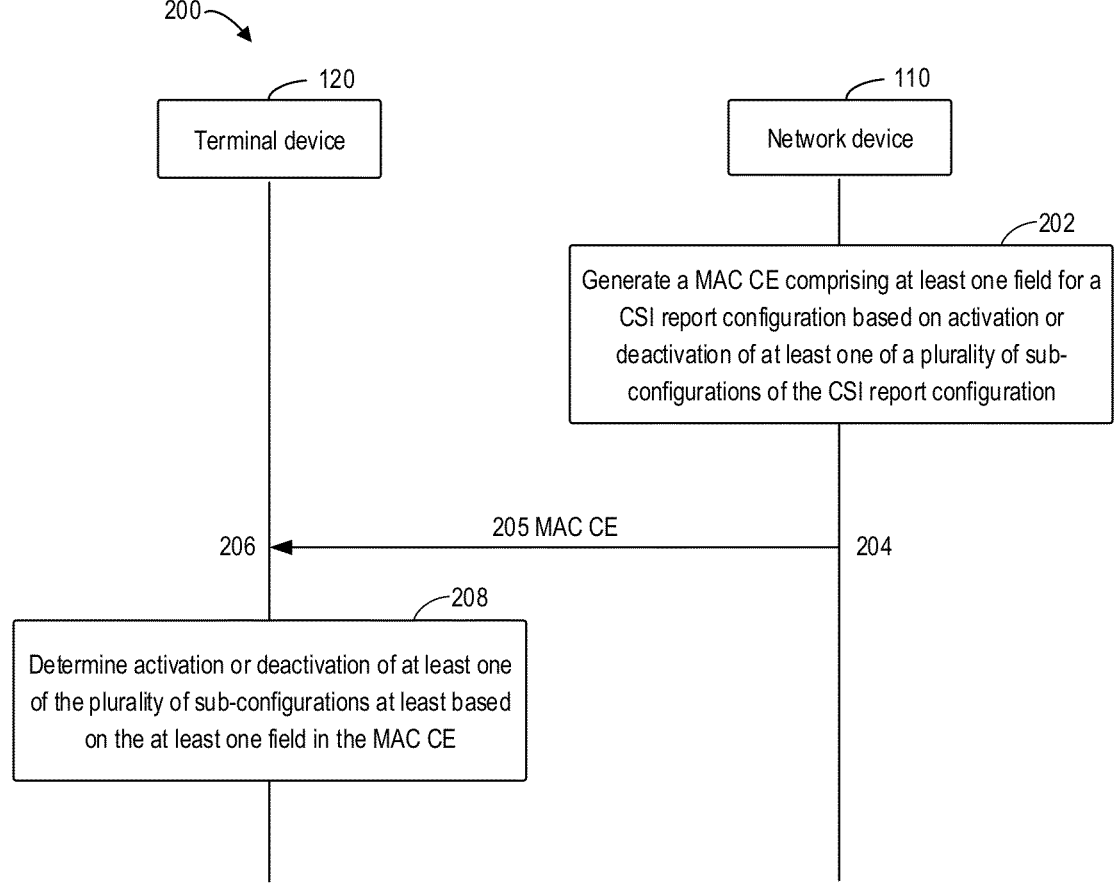
FIG. 2 illustrates an example of a process flow in accordance with some example embodiments of the present disclosure.

FIG. 2 illustrates an example of a process flow in accordance with some example embodiments of the present disclosure. For ease of understanding, the process flow 200 will be described with reference to FIG. 1. It would be appreciated that although the process flow 200 has been described referring to the communication network 100 of FIG. 1, this process flow 200 may be likewise applied to other similar communication scenarios.

As shown in FIG. 2, the network device 110 generates (202) a MAC CE comprising at least one field for a CSI report configuration based on activation or deactivation of at least one of a plurality of sub-configurations of the CSI report configuration. In some embodiments, the network device 110 may configure in advance the terminal device 120 with at least one CSI report configurations (e.g., 4 configurations configurations) and via for example RRC signaling. The CSI report configuration may be used for semi-persistent CSI reporting on physical PUCCH, and may be activated or deactivated via MAC CE.

In some embodiments, one or more of the multiple CSI report configurations may include or be associated with a plurality of sub-configurations. The sub-configurations of the CSI report configuration may also be configured via RRC signaling. In some embodiments, a sub-configuration among the plurality of sub-configurations may correspond to or be associated or be replaced with one or more of: a spatial pattern; a power level; an energy level; a CSI-reference signal (RS) resource; a CSI-RS resource set; a resource setting; a CSI report configuration; a codebook configuration; or a CSI triggering state. The spatial pattern may refer to a spatial configuration of active/inactive antenna ports/elements at the network device 120, and may be associated with a corresponding power consumption level.

In some embodiments, the network device 110 may encode the activation or deactivation statuses of the CSI report configuration and at least one associated sub-configuration into the MAC CE. The activation or deactivation status of the CSI report configuration may be encoded as a bitmap in at least one octet of the MAC CE, where one bit for one CSI report configuration. For example, the value "1" may indicate the activation status, and the value "0" may indicate the deactivation status. In addition, the activation or deactivation status of at least one sub-configuration is encoded in at least one additional field of the MAC CE. This field may indicate, for example, in form of a codepoint or a bitmap, a number of sub-configurations among the plurality of sub-configurations of the CSI report configuration to activate or deactivate at the terminal device 120. For brevity, details will be described with reference to FIG. 3 from a perspective of the terminal device 120 at a decoding stage.

Then, the network device 110 transmits (204) the MAC CE (205) to the terminal device 120. Accordingly, the terminal device 120 receives (206) the MAC CE. Upon reception of the MAC CE (205), the terminal device 120 determines activation or deactivation of at least one of the plurality of sub-configurations at least based on the at least one field in the MAC CE.

In some embodiments, the terminal device 120 may perform a decoding procedure to obtain the activation or deactivation status of the CSI report configuration and associated sub-configurations encoded in the MAC CE. In some embodiments, the activation of a sub-configuration or a set of sub-configurations may indicate that the sub-configuration or the set of sub-configurations is applicable, and the deactivation of a sub-configuration or a set of sub-configurations may indicate that the sub-configuration or the set of sub-configurations is inapplicable.

Afterwards, the terminal device 120 may perform CSI measurements on CSI resources associated with the activated sub-configurations and report CSI(s) in one reporting instance to the network device 110.

Figure 3:
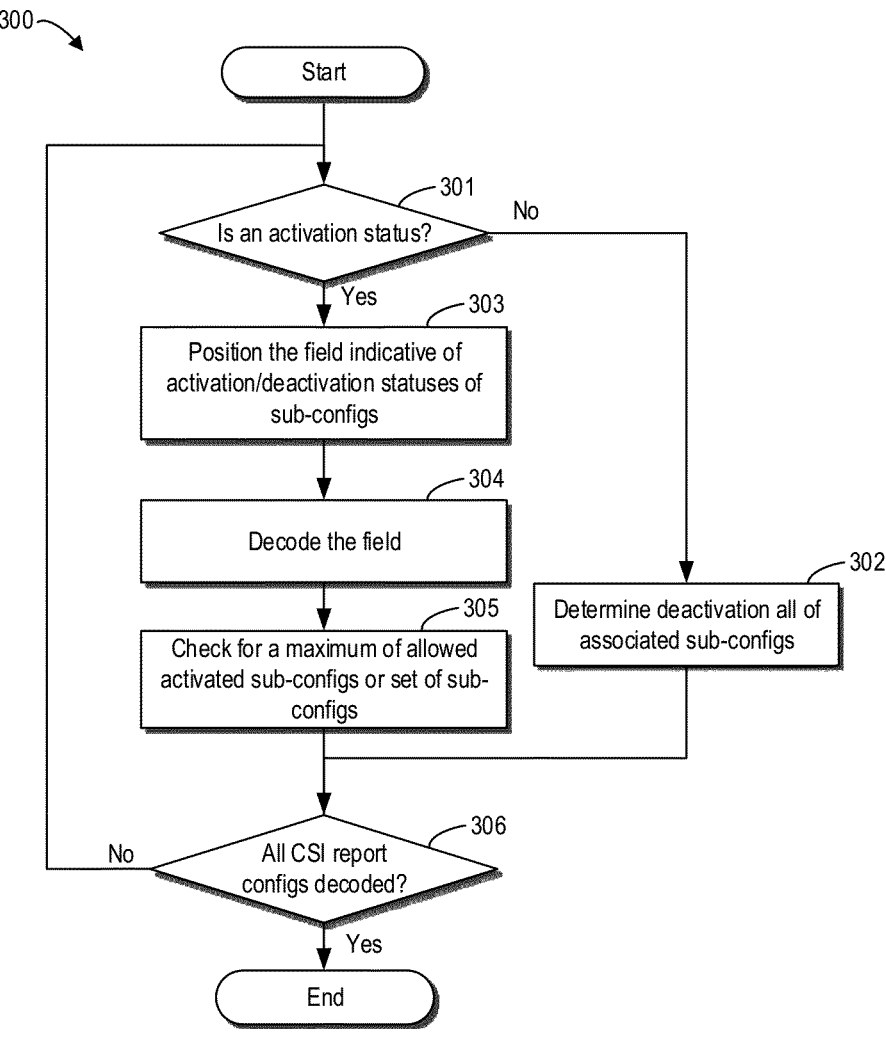
FIG. 3 illustrates an example process implemented at a terminal device according to example embodiments of the present disclosure.

FIG. 3 illustrates an example process 300 implemented at UE side according to example embodiments of the present disclosure. The process 300 may be an example implementation of block 208 in FIG. 2 and may be implemented by a UE as example of the terminal device 120. It is to be understood that the process 300 may include additional acts not shown and/or omit some of the illustrated acts. The scope of the disclosure is not limited in this regard.

As mentioned, the UE may be configured with a CSI report configuration that includes or is associated with multiple sub-configurations. Examples of encoding/decoding of at least part of the MAC CE activating/deactivating semi-persistent CSI reporting for one or more sub-configurations in case of semi-persistent CSI reporting on PUCCH will be described in the following.

If the at least one bit in the MAC CE deactivates the semi-persistent CSI reporting configuration, e.g., through bit value '0', all the sub-configurations belonging or associated to this configuration are assumed deactivated. The UE considers that no reserved/existing bit(s) or additional field(s)/octet(s)/subfield(s) for the indication related to sub-configurations is used/present/made available in the MAC CE.

If at least one bit in this MAC CE activates a semi-persistent CSI reporting configuration on PUCCH, e.g., through bit value '1', and this configuration includes or is associated with multiple sub-configurations, activating or deactivating at least one sub-configuration may be done using one or more of the following options.

In Option 1, the UE considers that at least one reserved/existing bit in the MAC CE is made available and used to indicate the activation or deactivation of at least one sub-configuration. The at least one reserved/existing bit may be in the same octet as the activation or deactivation statuses of the multiple preconfigured CSI report configurations.

In Option 2, the UE considers that at least one field (e.g., at least one octet (8 bits)) and/or at least one subfield (consisting of at least one or two bits) is present or is not reserved in the MAC CE and is used to indicate the activation or deactivation of at least one sub-configuration. The at least one field for the sub-configurations may comprise at least one bit beyond the octet including the activation or deactivation statuses of the multiple preconfigured CSI report configurations. In some embodiments, the MAC CE may include at least one additional octet for the sub-configurations.

Option 1 may be assumed if the number of sub-configurations in the report configuration is lower than or equal to a threshold. Option 2 may be assumed if the number of configurations in the report configuration is greater than a threshold. Also, Option 2 may be assumed if a certain number of active CSI report configurations that includes multiple sub-configurations is greater than or equal to a threshold such as 2. In addition, the Option 1 and Option 2 may be combined.

By use of one or more of Option 1 and Option 2, the MAC CE may include at least one field to indicate activation or deactivation of the sub-configurations of CSI report configuration(s). In some embodiments, this indication may be in form of a codepoint representing index of a sub-configuration to activate or deactivate or representing a set of sub-configurations to activate or deactivate. The set of sub-configurations may be included or associated with the CSI report configuration, i.e., one or more sub-configurations may be grouped in a set (and there may be several of such sets). Alternatively, this indication may be in form of a bitmap where a bit in the bitmap may indicate the activation or deactivation of at least one sub-configuration (or a set of sub-configurations). Alternatively, a number of sub-configurations to activate or deactivate may be indicated, and the UE follows a defined order (based on specifications or configuration) to determine the sub-configuration(s) to activate or deactivate, such as by e.g., considering the sub-configurations with lowest/highest index or identity first.

In some embodiments, the field/subfield/octet may be at least partially shared between at least two CSI report configurations, or alternatively, one field/subfield/octet is assumed per CSI report configuration.

In some embodiments, the field/subfield/bitmap size to consider/add for a CSI report configuration in the MAC CE may depend on the number of sub-configurations (or sub-configuration sets) belonging or corresponding to this CSI report configuration.

In some embodiments, the need for a new octet/field/subfield may depend on whether the existing/reserved bits are sufficient or not, e.g., whether Option 1 is sufficient or not. This may also depend on whether at least one other CSI report configuration is activated, where this at least other configuration includes or is associated with sub-configurations, and at least one of these sub-configurations is indicated to be activated/deactivated.

In some embodiments, considering a CSI report configuration, the need for more than one octet/field/subfield may depend on whether the number of sub-configurations or sets of sub-configurations is greater than a threshold, such as 8. For example, if a bit map is used and the CSI report configuration includes more than 8 sub-configurations, the field for the CSI report configuration would require more than 8 bits (1 octet).

In some embodiments, a maximum number of sub-configurations or sub-configuration set, belonging/associated to the same CSI report configuration, may be specified/configured not to be active at a time. Thus, for example, if this number is set to 1, if one sub-configuration (or sub-configuration set) is activated, this may mean that the other sub-configuration(s) (or sub-configuration set(s)) is automatically deactivated. More generally, if this number is set to X, if X sub-configurations (or sub-configuration sets) are activated, this may mean that the other sub-configuration(s) (or sub-configuration set(s)) are automatically deactivated.

In the process 300, the UE decodes activation or deactivation status in the MAC CE per CSI report configuration. At block 301, for a given CSI report configuration, the UE checks whether the CSI report configuration has an activation status. If the bit value for the CSI indicates a deactivation status (e.g., "0"), the process proceeds to block 302, where the UE may determine deactivation of all of associated sub-configurations of the CSI report configuration, and then move on to block 306 to check for the next CSI report configuration (if any).

If the CSI report configuration has an activation status, the process 300 proceeds to block 303. At block 303, the UE positions the field indicative of activation/deactivation statuses of sub-configurations of the CSI report configuration. In some embodiments, the position of the field may be based on the activation or deactivation statuses of the multiple CSI report configurations pre-configured at the UE. If a CSI report configuration is to be deactivated via the MAC CE, there may be no corresponding field for its sub-configurations in the MAC CE. The position may be further based on an index or an identity of the CSI report configuration. For example, the fields for the activated CSI configurations may be ordered one by one in the MAC CE. In addition, the position may be based on a number of sub-configurations or sets of sub-configurations of each of at least (activated) one of the multiple CSI report configurations. That is, the position also depends on the sizes of fields for the preceding CSI report configuration(s). Alternatively, the positions of the fields may be fixed in the MAC CE, regardless of the activation or deactivation statuses of the multiple CSI report configurations.

After the field is positioned in the MAC CE, the UE may obtain the value of the field, and at block 304 decode the field. As mentioned, the field may be in form of a codepoint representing index of a sub-configuration to activate or deactivate or represent a set of sub-configurations to activate or deactivate. Alternatively, the field may be in form of a bitmap where a bit in the bitmap may indicate the activation or deactivation of at least one sub-configuration or a set of sub-configurations. For example, a bit value "1" indicates the activation status, and a bit value "0" indicates the activation status for the corresponding sub-configuration or set of sub-configurations.

In some embodiments, a size of the field may be based on a number of the sub-configurations or sets of sub-configurations of the CSI report configuration. For example, if the field comprises a bitmap, the size of the bitmap in bits is equal to the number of sub-configurations or the number of sets of sub-configurations. As another example, if the field comprises a codepoint, the size of in bits is equal to the number of binary digits for representing the maximum/largest index of the sub-configuration or set of sub-configurations. By decoding the field, the UE knows the sub-configuration(s) or set(s) of sub-configurations to activate or deactivate. In some embodiments, the UE may be configured or specified with a maximum number of sub-configurations or sets of sub-configurations that could activated for a CSI report configuration. This maximum number may impact the size of the field. In some embodiments, the UE may be configured with a restriction on which sub-configurations or sets of sub-configurations could be activated or not activated. This restriction may also impact the size of the field, as only sub-configurations or sets of sub-configurations that are not restricted from being activated could be indicated in the field (via MAC CE).

In addition, at block 305 the UE may check for a maximum of allowed activated sub-configurations or set of configurations. The UE may be configured or specified with a threshold indicative of the maximum activated sub-configurations or set of configurations. The UE may determine, based on the field and the threshold, activation or deactivation of a sub-configuration or set of sub-configurations, such that a number of activated sub-configurations or sets of sub-configurations is equal to or less than the threshold. For example, if this threshold is set to 1, if one sub-configuration (or sub-configuration set) is activated, this may mean that the other sub-configuration(s) (or sub-configuration set(s)) is to be automatically deactivated.

At block 306, the UE checks whether all CSI report configurations are decoded. If no, the process 300 returns to block 301 and repeat the actions in blocks 301 to 305 for the next CSI report configuration. If all CSI report configuration are decoded, the process 300 ends.

FIG. 4A illustrates a first example MAC CE design for activating/deactivating semi-persistent CSI reporting when multiple sub-configurations are associated with a CSI report configuration. The multiple sub-configurations may correspond to e.g., different spatial adaption patterns or even different power offsets (for PDSCH relative to CSI-RS).

In FIG. 4A, Oct 2 comprises bits $S_0$ to $S_3$ each indicating an activation or deactivation status of a CSI report configuration. As an example, $S_0$ (0 or 1) refers to one CSI report configuration. Assume $S_0=1$, i.e., the corresponding CSI report configuration is activated. This configuration includes or is associated with multiple sub-configurations (or set of sub-configurations). Since $S_0=1$, existing/reserved bits (in this example, 3 bits) R0, R1 and R2 in Oct 2 are used to indicate activation/deactivation of at least one sub-configuration from the sub-configurations belonging to or corresponding to the CSI report configuration referred to by $S_0$. In this example, 1 out of up to 8 sub-configurations (or set of sub-configurations) can be activated/referred to.

FIG. 4B illustrates a second example MAC CE design for activating/deactivating semi-persistent CSI reporting when multiple sub-configurations are associated with a CSI report configuration. The multiple sub-configurations may correspond to e.g., different spatial adaption patterns.

In FIG. 4B, Oct 2 comprises bits $S_0$ to $S_3$ each indicating an activation or deactivation status of a CSI report configuration. As an example, $S_0$ (0 or 1) refers to one CSI report configuration. Assume $S_0=1$, i.e., the corresponding CSI report configuration is activated. This configuration includes or is associated with (up to) 8 multiple sub-configurations. Since $S_0=1$, existing/reserved bits (in this example, 3 bits) $R_{00}$, $R_{01}$, $R_{02}$ in Oct 2 are used to indicate activation/deactivation of at least one sub-configuration from the sub-configurations belonging to or corresponding to the CSI report configuration referred to by $S_0$. In this example, 1 out of up to 8 sub-configurations can be activated/referred to.

In addition, $S_1$ (0 or 1) refers to one CSI report configuration. Assume $S_1=1$, i.e., the corresponding CSI report configuration is activated. This configuration includes or is associated with e.g., (up to) 4 sub-configurations. Since $S_1=1$, new field/octet (Oct 3) is added where 2 bits $S_{11}$, $S_{10}$ are considered for the activation/deactivation of at least one sub-configuration from the sub-configurations belonging to or corresponding to the CSI report configuration referred to by $S_1$. In this example, 1 out of (up to) 4 sub-configurations can be activated/referred to.

FIG. 4C illustrates a third example MAC CE design for activating/deactivating semi-persistent CSI reporting when multiple sub-configurations are associated with a CSI report configuration. The multiple sub-configurations may correspond to e.g., different spatial adaption patterns.

In FIG. 4C, Oct 2 comprises bits $S_0$ to $S_3$ each indicating an activation or deactivation status of a CSI report configuration. $S_0$ (0 or 1): It refers to one CSI report configuration. Assume $S_0=1$, i.e., the corresponding CSI report configuration is activated. This configuration includes or is associated with 7 multiple sub-configurations. Since $S_0=1$, new field/octet (Oct 3) is added where a bitmap of size 7 is considered for the activation/deactivation of at least one sub-configuration from the sub-configurations belonging to or corresponding to the CSI report configuration referred to by $S_0$. In this example, any combinations of 1-7 sub-configurations can be activated/deactivated/referred to. If the bitmap of size is larger than 8, the field may span across multiple octets.

In addition, $S_1$ (0 or 1) refers to one CSI report configuration. Assume $S_1=1$, i.e., the corresponding CSI report configuration is activated. This configuration includes or is associated with 4 sub-configurations. Since $S_1=1$, new field/octet (Oct 4) is added where a bitmap of size 4 is considered for the activation/deactivation of at least one sub-configuration from the sub-configurations belonging to or corresponding to the CSI report configuration referred to by $S_1$. In this example, any combination of 1-4 sub-configurations can be activated/deactivated/referred to.

FIG. 4D illustrates a fourth example MAC CE design for activating/deactivating semi-persistent CSI reporting when multiple sub-configurations are associated with a CSI report configuration. The multiple sub-configurations may correspond to e.g., different spatial adaption patterns.

In FIG. 4D, Oct 2 comprises bits $S_0$ to $S_3$ each indicating an activation or deactivation status of a CSI report configuration. $S_0$ (0 or 1) refers to one CSI report configuration. Assume $S_0=1$, i.e., the corresponding CSI report configuration is activated. This configuration includes or is associated with 4 multiple sub-configurations. Since $S_0=1$, new field/octet (Oct 3) is added where a bitmap of size 4 ($S_{00}$, $S_{01}$, $S_{02}$, and $S_{03}$) is considered for the activation/deactivation of at least one sub-configuration from the sub-configurations belonging to or corresponding to the CSI report configuration referred to by $S_0$. In this example, any combinations of 1-4 sub-configurations can be activated/deactivated/referred to.

In addition, $S_1$ (0 or 1) refers to one CSI report configuration. Assume $S_1=1$, i.e., the corresponding CSI report configuration is activated. This configuration includes or is associated with 4 sub-configurations. Since $S_1=1$, new field/octet is added where a bitmap of size 4 ($S_{10}$, $S_{11}$, $S_{12}$, and $S_{13}$) is considered for the activation/deactivation of at least one sub-configuration from the sub-configurations belonging to or corresponding to the CSI report configuration referred to by $S_1$. In this example any combination of 1-4 sub-configurations can be activated/deactivated/referred to. Note that the field for the CSI report configuration $S_1$ is positioned in the same octet as $S_1$, since there is enough space in Oct 3.

It is to be understood that the examples of MAC CE in FIG. 4A to FIG. 4D are provided for illustrative purpose without limiting. The MAC CE according to the embodiments of the present disclosure may have different designs, for example, with more or less CSI report configurations, more or less sub-configurations associated with a CSI report configuration, or with field(s) indicative of activation or deactivation of sub-configurations in sets.

In view of above, some embodiments of the disclosure provide an efficient design/encoding of MAC CE for the activation of semi-persistent CSI report to enable the operation of activating/deactivating CSI for one or more sub-configurations when multiple sub-configurations (referring to e.g., different spatial adaptation patterns) are included or associated with a same CSI reporting configuration FIG. 5 illustrates a flowchart of an example method 500 implemented at a terminal device in accordance with some other embodiments of the present disclosure. For ease of understanding, the method 500 will be described from the perspective of the terminal device 120 with reference to FIG. 1.

At block 510, the terminal device 120 receives a medium access control (MAC) control element (MAC CE) comprising at least one field for a channel state information (CSI) report configuration, wherein the CSI report configuration comprises a plurality of sub-configurations. At block 520, the terminal device 120 determines activation or deactivation of at least one of the plurality of sub-configurations at least based on the at least one field in the MAC CE.

In some embodiments, the at least one field may indicate an index of a sub-configuration or a set of sub-configurations among the plurality of sub-configurations to activate or deactivate.

Additionally or alternatively, the at least one field may comprise a bitmap for the plurality of sub-configurations. A bit in the bitmap indicates an activation or deactivation status of a sub-configuration or a set of sub-configurations among the plurality of sub-configurations.

Additionally or alternatively, the at least one field may indicate a number of sub-configurations among the plurality of sub-configurations to activate or deactivate. The terminal device 120 may determine an index of the at least one of the plurality of sub-configurations to activate or deactivate based on the indicated number and a defined order of indexes of the plurality of sub-configurations.

In some embodiments, a size of the at least one field may be based on a number of the plurality of sub-configurations or sets of sub-configurations of the CSI report configuration.

In some embodiments, the MAC CE further may comprise activation or deactivation statuses of multiple CSI report configurations configured at the terminal device. In some embodiments, the activation or deactivation statuses of the multiple CSI report configurations may be included in at least one octet. Additionally or alternatively, the at least one field may comprise at least one reserved bit of the at least one octet. Additionally or alternatively, the at least one field may comprise at least one bit beyond the at least one octet. Additionally or alternatively, the at least one field may comprise at least one additional octet other than the at least one octet.

In some embodiments, the terminal device 120 may determine activation or deactivation of at least one of the plurality of sub-configurations by determining, based on determining that the CSI report configuration has a deactivation status, deactivation of the plurality of sub-configurations of the CSI report configuration.

In some embodiments, the terminal device 120 may determine activation or deactivation of at least one of the plurality of sub-configurations by determining, based on determining that the CSI report configuration has an activation status, activation or deactivation of the at least one of the plurality of sub-configurations based on the at least one field in the MAC CE.

In some embodiments, the terminal device 120 may determine activation or deactivation of at least one of the plurality of sub-configurations by positioning the at least one field for the CSI report configuration in the MAC CE and determining activation or deactivation of at least one of the plurality of sub-configurations based on a value of the at least one field.

In some embodiments, the positioning of the at least one field may be at least based on at least one of the following: the activation or deactivation statuses of the multiple CSI report configurations; a number of the plurality of sub-configurations or sets of sub-configurations of each of at least one of the multiple CSI report configurations; or an index or an identity of the CSI report configuration.

In some embodiments, the at least one field may be at least shared between the CSI report configuration and another one of the multiple CSI report configurations.

In some embodiments, the terminal device 120 may determine activation or deactivation of at least one of the plurality of sub-configurations by determining, based on the at least one field and a threshold, activation or deactivation of at least one sub-configuration or set of sub-configurations, such that a number of activated sub-configurations or sets of sub-configurations is equal to or less than the threshold.

In some embodiments, the activation or deactivation of at least one of the plurality of sub-configurations may indicate that the at least one sub-configuration is applicable or inapplicable respectively.

In some embodiments, a sub-configuration among the plurality of sub-configurations may correspond to or be associated with at least one of the following: a spatial pattern; a power level; an energy level; a CSI-reference signal (RS) resource; a CSI-RS resource set; a resource setting; a CSI report configuration; a codebook configuration; or a CSI triggering state.

In some embodiments, the CSI report configuration may be for semi-persistent CSI reporting on physical uplink control channel (PUCCH).

FIG. 6 illustrates another flowchart of an example method implemented at a network device in accordance with some embodiments of the present disclosure. For ease of understanding, the method 600 will be described from the perspective of the network device 110 with reference to FIG. 1.

At block 610, the network device 110 generates a medium access control (MAC) control element (MAC CE) comprising at least one field for a channel state information (CSI) report configuration based on activation or deactivation of at least one of a plurality of sub-configurations of the CSI report configuration. At block 620, the network device 110 transmits the MAC CE to a terminal device.

In some embodiments, the at least one field may indicate an index of a sub-configuration or a set of sub-configurations among the plurality of sub-configurations to activate or deactivate. Additionally or alternatively, the at least one field may comprise a bitmap for the plurality of sub-configurations. A bit in the bitmap indicates an activation or deactivation status of a sub-configuration or a set of sub-configurations among the plurality of sub-configurations. Additionally or alternatively, the at least one field may indicate a number of sub-configurations among the plurality of sub-configurations to activate or deactivate.

In some embodiments, a size of the at least one field may be based on a number of the plurality of sub-configurations or sets of sub-configurations of the CSI report configuration.

In some embodiments, the MAC CE may further comprise activation or deactivation statuses of multiple CSI report configurations configured at the terminal device. In some embodiments, the activation or deactivation statuses of the multiple CSI report configurations may be included in at least one octet. Additionally or alternatively, the at least one field may comprise at least one reserved bit of the at least one octet. Additionally or alternatively, the at least one field may comprise at least one bit beyond the at least one octet. Additionally or alternatively, the at least one field may comprise at least one additional octet other than the at least one octet.

In some embodiments, a position of the at least one field may be at least based on at least one of the following: the activation or deactivation statuses of the multiple CSI report configurations; a number of the plurality of sub-configurations or sets of sub-configurations of each of at least one of the multiple CSI report configurations; or an index or an identity of the CSI report configuration.

In some embodiments, the at least one field may be at least shared between the CSI report configuration and another one of the multiple CSI report configurations.

In some embodiments, the activation or deactivation of at least one of the plurality of sub-configurations may indicate that the at least one sub-configuration is applicable or inapplicable respectively.

In some embodiments, a sub-configuration among the plurality of sub-configurations may correspond to or be associated with at least one of the following: a spatial pattern; a power level; an energy level; a CSI-reference signal (RS) resource; a CSI-RS resource set; a resource setting; a CSI report configuration; a codebook configuration; or a CSI triggering state.

In some embodiments, the CSI report configuration may be for semi-persistent CSI reporting on physical uplink control channel (PUCCH).

In some embodiments, an apparatus capable of performing the method 500 (for example, the terminal device 120) may comprise means for performing the respective steps of the method 500. The means may be implemented in any suitable form. For example, the means may be implemented in a circuitry or software module.

In some example embodiments, the apparatus comprises: means for receiving, at a terminal device, a medium access control (MAC) control element (MAC CE) comprising at least one field for a channel state information (CSI) report configuration, wherein the CSI report configuration comprises a plurality of sub-configurations; and means for determining activation or deactivation of at least one of the plurality of sub-configurations at least based on the at least one field in the MAC CE.

In some embodiments, the at least one field may indicate an index of a sub-configuration or a set of sub-configurations among the plurality of sub-configurations to activate or deactivate.

Additionally or alternatively, the at least one field may comprise a bitmap for the plurality of sub-configurations. A bit in the bitmap indicates an activation or deactivation status of a sub-configuration or a set of sub-configurations among the plurality of sub-configurations.

Additionally or alternatively, the at least one field may indicate a number of sub-configurations among the plurality of sub-configurations to activate or deactivate. The apparatus may further comprise means for determining an index of the at least one of the plurality of sub-configurations to activate or deactivate based on the indicated number and a defined order of indexes of the plurality of sub-configurations.

In some embodiments, a size of the at least one field may be based on a number of the plurality of sub-configurations or sets of sub-configurations of the CSI report configuration.

In some embodiments, the MAC CE further may comprise activation or deactivation statuses of multiple CSI report configurations configured at the terminal device. In some embodiments, the activation or deactivation statuses of the multiple CSI report configurations may be included in at least one octet. Additionally or alternatively, the at least one field may comprise at least one reserved bit of the at least one octet. Additionally or alternatively, the at least one field may comprise at least one bit beyond the at least one octet.

Additionally or alternatively, the at least one field may comprise at least one additional octet other than the at least one octet.

In some embodiments, means for determining activation or deactivation of at least one of the plurality of sub-configurations may comprise means for determining, based on determining that the CSI report configuration has a deactivation status, deactivation of the plurality of sub-configurations of the CSI report configuration.

In some embodiments, means for determining activation or deactivation of at least one of the plurality of sub-configurations may comprise means for determining, based on determining that the CSI report configuration has an activation status, activation or deactivation of the at least one of the plurality of sub-configurations based on the at least one field in the MAC CE.

In some embodiments, means for determining activation or deactivation of at least one of the plurality of sub-configurations may comprise means for positioning the at least one field for the CSI report configuration in the MAC CE and means for determining activation or deactivation of at least one of the plurality of sub-configurations based on a value of the at least one field.

In some embodiments, the positioning of the at least one field may be at least based on at least one of the following: the activation or deactivation statuses of the multiple CSI report configurations; a number of the plurality of sub-configurations or sets of sub-configurations of each of at least one of the multiple CSI report configurations; or an index or an identity of the CSI report configuration.

In some embodiments, the at least one field may be at least shared between the CSI report configuration and another one of the multiple CSI report configurations.

In some embodiments, means for positioning the at least one field for the CSI report configuration in the MAC CE may comprise means for determining, based on the at least one field and a threshold, activation or deactivation of at least one sub-configuration or set of sub-configurations, such that a number of activated sub-configurations or sets of sub-configurations is equal to or less than the threshold.

In some embodiments, the activation or deactivation of at least one of the plurality of sub-configurations may indicate that the at least one sub-configuration is applicable or inapplicable respectively.

In some embodiments, a sub-configuration among the plurality of sub-configurations may correspond to or be associated with at least one of the following: a spatial pattern; a power level; an energy level; a CSI-reference signal (RS) resource; a CSI-RS resource set; a resource setting; a CSI report configuration; a codebook configuration; a CSI triggering state.

In some embodiments, the CSI report configuration may be for semi-persistent CSI reporting on physical uplink control channel (PUCCH).

In some embodiments, the apparatus further comprises means for performing other steps in some embodiments of the method 500. In some embodiments, the means comprises at least one processor and at least one memory including computer program code, the at least one memory and computer program code configured to, with the at least one processor, cause the performance of the apparatus.

In some embodiments, an apparatus capable of performing the method 600 (for example, the network device 110) may comprise means for performing the respective steps of the method 600. The means may be implemented in any suitable form. For example, the means may be implemented in a circuitry or software module.

In some example embodiments, the apparatus comprises: means for generating, at a network device, a medium access control (MAC) control element (MAC CE) comprising at least one field for a channel state information (CSI) report configuration based on activation or deactivation of at least one of a plurality of sub-configurations of the CSI report configuration; and means for transmitting the MAC CE to a terminal device.

In some embodiments, the at least one field may indicate an index of a sub-configuration or a set of sub-configurations among the plurality of sub-configurations to activate or deactivate. Additionally or alternatively, the at least one field may comprise a bitmap for the plurality of sub-configurations. A bit in the bitmap indicates an activation or deactivation status of a sub-configuration or a set of sub-configurations among the plurality of sub-configurations. Additionally or alternatively, the at least one field may indicate a number of sub-configurations among the plurality of sub-configurations to activate or deactivate.

In some embodiments, a size of the at least one field may be based on a number of the plurality of sub-configurations or sets of sub-configurations of the CSI report configuration.

In some embodiments, the MAC CE may further comprise activation or deactivation statuses of multiple CSI report configurations configured at the terminal device. In some embodiments, the activation or deactivation statuses of the multiple CSI report configurations may be included in at least one octet. Additionally or alternatively, the at least one field may comprise at least one reserved bit of the at least one octet. Additionally or alternatively, the at least one field may comprise at least one bit beyond the at least one octet. Additionally or alternatively, the at least one field may comprise at least one additional octet other than the at least one octet.

In some embodiments, a position of the at least one field may be at least based on at least one of the following: the activation or deactivation statuses of the multiple CSI report configurations; a number of the plurality of sub-configurations or sets of sub-configurations of each of at least one of the multiple CSI report configurations; or an index or an identity of the CSI report configuration.

In some embodiments, the at least one field may be at least shared between the CSI report configuration and another one of the multiple CSI report configurations.

In some embodiments, the activation or deactivation of at least one of the plurality of sub-configurations may indicate that the at least one sub-configuration is applicable or inapplicable respectively.

In some embodiments, a sub-configuration among the plurality of sub-configurations may correspond to or be associated with at least one of the following: a spatial pattern; a power level; an energy level; a CSI-reference signal (RS) resource; a CSI-RS resource set; a resource setting; a CSI report configuration; a codebook configuration; or a CSI triggering state.

In some embodiments, the CSI report configuration may be for semi-persistent CSI reporting on physical uplink control channel (PUCCH).

In some embodiments, the apparatus further comprises means for performing other steps in some embodiments of the method 600. In some embodiments, the means comprises at least one processor and at least one memory including computer program code, the at least one memory and computer program code configured to, with the at least one processor, cause the performance of the apparatus.

Figure 7:
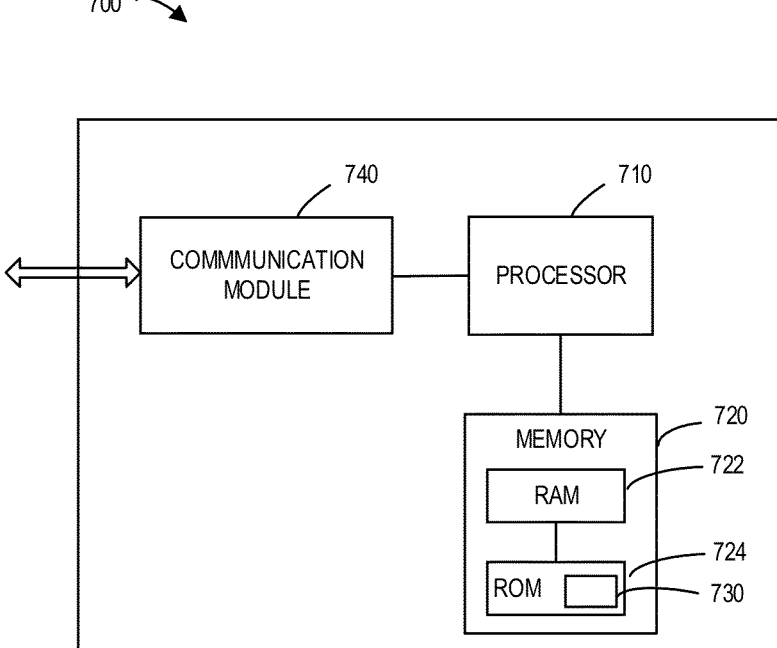
FIG. 7 illustrates an example simplified block diagram of a device that is suitable for implementing embodiments of the present disclosure.

FIG. 7 illustrates a simplified block diagram of a device 700 that is suitable for implementing some example embodiments of the present disclosure. The device 700 may be provided to implement a communication device, for example, the network device 110 or the terminal device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 3, 5 and 6. The embodiments of the present disclosure may also be implemented by hardware or by a combination of software and hardware.

In some example embodiments, the program 730 may be tangibly contained in a computer-readable medium which may be included in the device 700 (such as in the memory 720) or other storage devices that are accessible by the device 700. The device 700 may load the program 730 from the computer-readable medium to the RAM 722 for execution. The computer-readable medium may include any types of tangible non-volatile storage, such as ROM, EPROM, a flash memory, a hard disk, CD, DVD, and the like.

Figure 8:
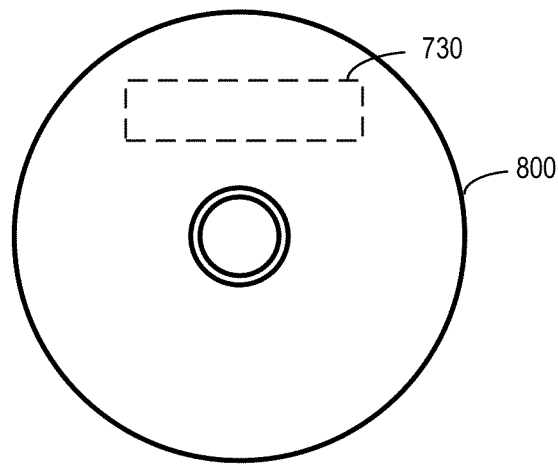
FIG. 8 illustrates an example block diagram of an example computer readable medium in accordance with some embodiments of the present disclosure.

FIG. 8 illustrates a block diagram of an example of a computer-readable medium 600 in accordance with some example embodiments of the present disclosure. The computer-readable medium 800 has the program 730 stored thereon. It is noted that although the computer-readable medium 800 is depicted in form of CD or DVD in FIG. 8, the computer-readable medium 800 may be in any other form suitable for carry or hold the program 730.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer-readable storage medium. The computer program product includes computer-executable instructions, such as those included in program modules, being executed in a device on a target real or virtual processor, to carry out the process or method 300, 500 or 600 as described above with reference to FIG. 3, 5 or 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer-readable medium, and the like.

The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
at least one processor; and
at least one memory storing instructions that, when executed by the at least one processor, cause the terminal device at least to:
receive a medium access control (MAC) control element (MAC CE) comprising an octet including multiple fields, wherein the multiple fields indicate a respective activation or deactivation status of multiple channel state information (CSI) report configurations, wherein each CSI report configuration of the multiple CSI report configurations comprises a respective plurality of sub-configurations,
and wherein, if a respective CSI report configuration of the multiple CSI report configurations has an activation status, the MAC CE comprises a respective further octet including at least one further field, wherein the at least one further field indicates an activation or deactivation status of at least one of the plurality of sub-configurations of the respective CSI report configuration;
and if the respective CSI report configuration of the multiple CSI report configurations has a deactivation status, the MAC CE does not comprise the respective further octet; and
determine, if the respective CSI report configuration of the multiple CSI report configurations has an activation status, the activation or deactivation status of the at least one of the plurality of sub-configurations of the respective CSI report configuration at least based on the at least one further field of the MAC CE.

2. The terminal device of claim 1, wherein the terminal device is caused to:
perform CSI measurement using a sub-configuration having an activation status; and
report results of the CSI measurement to the network device.

3. The terminal device of claim 1, wherein the at least one further field indicates an index of a sub-configuration or a set of sub-configurations among the plurality of sub-configurations to activate or deactivate.

4. The terminal device of claim 1, wherein the at least one further field comprises a bitmap for the plurality of sub-configurations, and a bit in the bitmap indicates the activation or deactivation status of a sub-configuration or a set of sub-configurations among the plurality of sub-configurations.

5. The terminal device of claim 1, wherein the at least one further field indicates a number of sub-configurations among the plurality of sub-configurations to activate or deactivate, and wherein the terminal device is caused to determine activation or deactivation of at least one of the plurality of sub-configurations by:
determining an index of the at least one of the plurality of sub-configurations to activate or deactivate based on the indicated number and a defined order of indexes of the plurality of sub-configurations.

6. The terminal device of claim 1, wherein a size of the at least one further field is based on a number of the plurality of sub-configurations or sets of sub-configurations of the CSI report configuration.

7. The terminal device of claim 1, wherein at least one field indicating an activation or deactivation status of the respective CSI report configuration comprises at least one of the following:
at least one reserved bit of the octet;
at least one bit beyond the octet; and
at least one additional octet other than the octet.

8. The terminal device of claim 7, wherein the terminal device is caused to determine activation or deactivation of the at least one of the plurality of sub-configurations of the respective CSI report configuration by:
based on determining that the respective CSI report configuration has a deactivation status, determining deactivation of the plurality of sub-configurations of the respective CSI report configuration.

9. The terminal device of claim 7, wherein the octet including multiple fields is at least shared between the CSI report configuration and another one of the multiple CSI report configurations.

10. The terminal device of claim 9, wherein the terminal device is caused to determine activation or deactivation of the at least one of the plurality of sub-configurations by:
based on determining that the respective CSI report configuration has an activation status, determining activation or deactivation of the at least one of the plurality of sub-configurations based on the at least one further field in the MAC CE.

11. The terminal device of claim 7, wherein the terminal device is caused to determine activation or deactivation of the at least one of the plurality of sub-configurations by:
positioning the at least one further field for the CSI report configuration in the MAC CE; and
determining activation or deactivation of the at least one of the plurality of sub-configurations based on a value of the at least one further field.

12. The terminal device of claim 11, wherein the positioning of the at least one further field is at least based on at least one of the following:
the activation or deactivation statuses of the multiple CSI report configurations;
a number of the plurality of sub-configurations or sets of sub-configurations of each of at least one of the multiple CSI report configurations; or
an index or an identity of the CSI report configuration.

13. The terminal device of claim 1, wherein the terminal device is caused to determine activation or deactivation of at least one of the plurality of sub-configurations by:
determining, based on the at least one further field and a threshold, activation or deactivation of at least one sub-configuration or set of sub-configurations, such that a number of activated sub-configurations or sets of sub-configurations is equal to or less than the threshold.

14. The terminal device of claim 1, wherein the activation or deactivation of at least one of the plurality of sub-configurations indicate that the at least one sub-configuration is applicable or inapplicable respectively.

15. The terminal device of claim 1, wherein a sub-configuration among the plurality of sub-configurations corresponds to or is associated with at least one of the following:

a spatial pattern;

a power level;

an energy level;

a CSI-reference signal (RS) resource;

a CSI-RS resource set;

a resource setting;

a CSI report configuration;

a codebook configuration; or a CSI triggering state.

16. The terminal device of claim 1, wherein the respective CSI report configuration is for semi-persistent CSI reporting on physical uplink control channel (PUCCH).

17. The terminal device of claim 1, wherein the terminal device is caused to:

determine if the respective CSI report configuration of the multiple CSI report configurations has an activation status or deactivation status.

18. A network device comprising:

at least one processor; and at least one memory storing instructions that, when executed by the at least one processor, cause the network device at least to:

generate a medium access control (MAC) control element (MAC CE) comprising an octet including multiple fields, wherein the multiple fields indicate a respective activation status or deactivation status of multiple channel state information (CSI) report configurations, wherein each CSI report configuration of the multiple CSI report configurations comprises a respective plurality of sub-configurations; and wherein, if a respective CSI report configuration of the multiple CSI report configurations has an activation status, the MAC CE comprises a respective further octet including at least one further field, wherein the at least one further field indicates an activation or deactivation status of at least one of the plurality of sub-configurations of the respective CSI report configuration;

and if the respective CSI report configuration of the multiple CSI report configurations has a deactivation status, the MAC CE does not comprise the respective further octet; and transmit the MAC CE to a terminal device.

19. The network device of claim 18, wherein the at least one further field indicates an index of a sub-configuration or a set of sub-configurations among the plurality of sub-configurations to activate or deactivate.

20. The network device of claim 18, wherein the at least one further field comprises a bitmap for the plurality of the sub-configurations, and a bit in the bitmap indicates an activation or deactivation status of a sub-configuration or a set of sub-configurations among the plurality of sub-configurations.

21. The network device of claim 18, wherein the at least one field indicates a number of sub-configurations among the plurality of sub-configurations to activate or deactivate.

22. The network device of claim 18, wherein a size of the at least one further field is based on a number of the plurality of sub-configurations or sets of sub-configurations of the CSI report configuration.

23. The network device of claim 18, wherein at least one field indicating an activation or deactivation status of the respective CSI report configuration comprises at least one of the following:

at least one reserved bit of the octet;

at least one bit beyond the octet; and at least one additional octet other than the octet.

24. The network device of claim 23, wherein a position of the at least one further field in the MAC CE is at least based on at least one of the following:

the activation or deactivation statuses of the multiple CSI report configuration;

a number of the plurality of sub-configurations or sets of sub-configurations of each of at least one of the multiple CSI report configurations; or an index or an identity of the CSI report configuration.

25. The network device of claim 23, wherein the at least one further field is indicating an activation or deactivation status of the respective CSI report configuration is at least shared between the respective CSI report configuration and another one of the multiple CSI report configurations.

26. The network device of claim 18, wherein a sub-configuration among the plurality of sub-configurations corresponds to or is associated with at least one of the following:

a spatial pattern;

a power level;

an energy level;

a CSI-reference signal (RS) resource;

a CSI-RS resource set;

a resource setting;

a CSI report configuration;

a codebook configuration; or a CSI triggering state.

27. The network device of claim 18, wherein the respective CSI report configuration is for semi-persistent CSI reporting on physical uplink control channel (PUCCH).

28. A method comprising:

receiving, at a terminal device, a medium access control (MAC) control element (MAC CE) comprising octet including multiple fields, wherein the multiple fields indicate a respective activation or deactivation status of multiple channel state information (CSI) report configurations, wherein each CSI report configuration of the multiple CSI report configurations comprises a respective plurality of sub-configurations, and wherein, if a respective CSI report configuration of the multiple CSI report configurations has an activation status, the MAC CE comprises a respective further octet including at least one further field, wherein the at least one further field indicates an activation or deactivation status of at least one of the plurality of sub-configurations of the respective CSI report configuration;

and if the respective CSI report configuration of the multiple CSI report configurations has a deactivation status, the MAC CE does not comprise the respective further octet; and determining, if the respective CSI report configuration of the multiple CSI report configurations has an activation status, activation or deactivation of at least one of the plurality of sub-configurations of the respective CSI report configuration at least based on the at least one field in the MAC CE.

29. A method comprising:

generating, at a network device, a medium access control (MAC) control element (MAC CE) comprising an octet including multiple fields, wherein the multiple fields indicate a respective activation status or deactivation status of multiple channel state information (CSI) report configurations, wherein each CSI report configuration of the multiple CSI report configurations comprises a respective plurality of sub-configurations, and wherein, if a respective CSI report configuration of the multiple CSI report configurations has an activation status, the MAC CE comprises a respective further octet including at least one further field, wherein the at least one further field indicates an activation or deactivation status of at least one of the plurality of sub-configurations of the respective CSI report configuration; and if the respective CSI report configuration of the multiple CSI report configurations has a deactivation status, the MAC CE does not comprise the respective further octet; and transmitting the MAC CE to a terminal device.

\* \* \* \* \*